United States Patent
Druet et al.

(10) Patent No.: US 11,460,450 B2
(45) Date of Patent: Oct. 4, 2022

(54) METHOD AND SYSTEM FOR CONTROLLING THE INTEGRATED HEALTH OF A MECHANICAL STRUCTURE BY DIFFUSE ELASTIC WAVES

(71) Applicant: COMMISSARIAT A L'ENERGIE ATOMIQUE ET AUX ENERGIES ALTERNATIVES, Paris (FR)

(72) Inventors: Tom Druet, Paris (FR); Bastien Chapuis, Viroflay (FR); Emmanuel Moulin, Marly (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 606 days.

(21) Appl. No.: 16/469,625

(22) PCT Filed: Dec. 15, 2017

(86) PCT No.: PCT/EP2017/083000
§ 371 (c)(1),
(2) Date: Jun. 13, 2019

(87) PCT Pub. No.: WO2018/109159
PCT Pub. Date: Jun. 21, 2018

(65) Prior Publication Data
US 2019/0317056 A1 Oct. 17, 2019

(30) Foreign Application Priority Data
Dec. 15, 2016 (FR) ...................... 1662485

(51) Int. Cl.
*G01N 29/50* (2006.01)
*G01M 5/00* (2006.01)
(Continued)

(52) U.S. Cl.
CPC .............. *G01N 29/50* (2013.01); *G01M 5/00* (2013.01); *G01M 5/0066* (2013.01);
(Continued)

(58) Field of Classification Search
None
See application file for complete search history.

(56) References Cited

U.S. PATENT DOCUMENTS

| | | | | |
|---|---|---|---|---|
| 2007/0118335 A1* | 5/2007 | Andarawis | .......... | G01M 5/0066 702/188 |
| 2009/0301198 A1* | 12/2009 | Sohn | .................... | G01N 29/262 73/598 |
| 2010/0079258 A1* | 4/2010 | Ihn | ..................... | G01N 29/2475 340/10.41 |

FOREIGN PATENT DOCUMENTS

| | | | | |
|---|---|---|---|---|
| EP | 2 728 348 A2 | 5/2014 | | |
| EP | 2728348 A2 * | 5/2014 | ............... | G01H 5/00 |

(Continued)

OTHER PUBLICATIONS

Eric Larose et al. Reconstruction of Rayleigh-Lamb dispersion spectrum based on noise obtained from an air-jet forcing, Oct. 2007 (Year: 2007).*

(Continued)

*Primary Examiner* — Raul J Rios Russo
*Assistant Examiner* — Carl F. R. Tchatchouang
(74) *Attorney, Agent, or Firm* — BakerHostetler

(57) ABSTRACT

A method for monitoring the structural health of a structure that supports guided propagation modes of elastic waves, includes the following steps:
a) acquiring an ambient noise propagating through the structure by means of at least one pair of non-collocated elastic-wave sensors; b) estimating a function representative of an impulse response of the structure for elastic propagation between the constituent sensors of said pair; c) extract- (Continued)

ing at least one dispersion curve of the elastic propagation through the structure by time-frequency analysis of this function representative of an impulse response; and d) estimating at least one parameter indicative of a mechanical property of a constituent material of the structure from the dispersion curve obtained in step c). A system for implementing such a method is also provided.

15 Claims, 6 Drawing Sheets

(51) Int. Cl.
　　　*G01N 29/14*　　(2006.01)
　　　*G01M 11/08*　　(2006.01)
　　　*G01H 9/00*　　(2006.01)
　　　*G01H 11/08*　　(2006.01)

(52) U.S. Cl.
　　　CPC ........... *G01M 11/083* (2013.01); *G01N 29/14* (2013.01); *G01H 9/004* (2013.01); *G01H 11/08* (2013.01); *G01M 5/0008* (2013.01); *G01M 5/0025* (2013.01); *G01M 5/0091* (2013.01); *G01N 2291/0258* (2013.01); *G01N 2291/0423* (2013.01); *G01N 2291/269* (2013.01)

(56) References Cited

FOREIGN PATENT DOCUMENTS

| WO | 2015/082292 A1 | 6/2015 |
| WO | 2015/119498 A1 | 8/2015 |

OTHER PUBLICATIONS

Ambrozinski, et al., "Identification of material properties—efficient modelling approach based on guided wave propagation and spatial multiple signal classification", Structural Control and Health Monitoring, 22(7), pp. 969-983, 2015.
Auger, et al., "Time-Frequency Reassignment and Synchrosqueezing: An overview", IEEE Signal Processing Magazine, vol. 30, No. 6, Nov. 2013.
Bartoli, et al., "Modeling wave propagation in damped waveguides of arbitrary cross-section", Journal of Sound and Vibration 295, pp. 685-707, (2006).
Gallot et al., "A passive inverse filter for Green's function retrieval", J. Acoust. Soc. Am., 131 (1), Jan. 2012.
Pabisek, et al., "Identification of thin elastic isotropic plate parameters applying Guided Wave Measurement and Artificial Neural Networks", Mechanical Systems and Signal Processing, pp. 403-412, 2015.
Weaver, et al., "Ultrasonics without a source: Thermal fluctuation correlations at MHz frequencies", Physical Review Letters, 87, No. 13, 134301, 2001.
Stehly, et al., "Reconstructing Green's function by correlation of the coda of the correlation (C3) of ambient seismic noise", Journal of Geophysical Research, vol. 113, B11306, 2008.
Calomfirescu, "Lamb Waves for Structural Health Monitoring in Viscoelastic Composite Materials", Doctoral thesis, Université de Brème, 2008.
Larose, et al., "Reconstruction of Rayleigh-Lamb dispersion spectrum based on noise obtained from an air-jet forcing", The Journal of the Acoustical Society of America 122, Oct. 1, 2007.
Sabra, et al., "Using cross correlations of turbulent flow-induced ambient vibrations to estimate the structural impulse response. Application to structural health monitoring", The Journal of the Acoustical Society of America, vol. 121, Issue 4, pp. 1987-1995, May 8, 2007.

\* cited by examiner

METHOD AND SYSTEM FOR CONTROLLING THE INTEGRATED HEALTH OF A MECHANICAL STRUCTURE BY DIFFUSE ELASTIC WAVES

CROSS-REFERENCE TO RELATED APPLICATIONS

This application is a National Stage of International patent application PCT/EP2017/083000, filed on Dec. 15, 2017, which claims priority to foreign French patent application No. FR 1662485, filed on Dec. 15, 2016, the disclosures of which are incorporated by reference in their entirety.

FIELD OF THE INVENTION

The invention relates to a method for nondestructively testing a mechanical structure, and more particularly to a method for monitoring the structural health of such a structure. It also relates to a system allowing such a method to be implemented.

BACKGROUND

The invention applies to the nondestructive testing of any mechanical structure capable of guiding elastic waves. It may in particular be a question of a structure of beam or tube type (producing guidance in one dimension) or indeed of plate or shell type (producing guidance in two dimensions). It may also be a question of a large structure the surface of which is sufficiently regular to allow Rayleigh waves to be guided.

The term "beam" is understood to mean an object the length of which is larger (for example larger by at least a factor of ten) than its transverse dimensions. Beams are often used as structural elements, but driveshafts, rails or even cables may also be considered to be beam-type elements.

The term "plate" is understood to mean a mechanical structure bounded by two surfaces ("skins") that are approximately parallel and that have a thickness that is much smaller (at least by a factor of 10) than the smallest lateral dimension. A "shell" is a plate having a significant curvature. Plates and shells are widely used in mechanical engineering and in civil engineering. For example, the deck of a bridge, a concrete slab, an arch, the fuselage or the wings of an airplane, a tank, etc. may be modelled by plates or shells.

During the lifetime of a structure, the materials from which it is made age. It is therefore important to monitor the state of health of these materials in order to be certain that the structure is still able to play its role. Testing of the integrity of structures (works of art, airplanes, pipelines, etc.) during their lifetime is generally carried out during maintenance operations, with human intervention: to do this so-called "conventional" nondestructive testing (NDT) methods are used, in which the structure is probed by means of ultrasound or electromagnetic fields or, in certain cases, subjected to an elastic deformation.

A subject of active research for a number of years aims to integrate sensors into key points of the structure in order to automate the measurement in order to be able to repeat it at regular and generally short intervals and/or in order to be able to access information on the state of health of certain inaccessible zones, without dismantlement or interruption of the operation of the structure. Structural health monitoring (SHM) is then spoken of.

It has been proposed to carry out structural health monitoring using guided ultrasound waves (GWs) emitted and detected by piezoelectric transducers (PZT) integrated into the structure. These guided waves (in the case of structures of plate or shell type, "Lamb waves" are spoken of) propagate over a large distance—a few tens of centimeters to several hundred meters in very favorable geometries such as pipelines—and hence a limited number of transducers allows a large zone to be monitored.

Techniques for structural health monitoring and for tracking ageing based on guided waves are typically "active", i.e. the ultrasound waves are emitted by dedicated transducers, and therefore their characteristics (spectrum, intensity, emission time, etc.) are known. See for example:

L. Ambrozinski, P. Packo, L. Pieczonka, T. Stepinski, T. Uhl, W. J. Staszewski "Identification of material properties—efficient modelling approach based on guided wave propagation and spatial multiple signal classification" Structural Control and Health Monitoring, 22(7): 969-983, 2015.

M. Calomfirescu. "Lamb Waves for Structural Health Monitoring in Viscoelastic Composite Materials". Doctoral thesis, Université de Brème, 2008.

In the context of structural health monitoring, this approach has the drawback that the emission of the waves requires energy to be injected into the medium. This is expensive and generally is the dimensioning parameter, in particular because of the large impact on the on-board mass of the batteries powering the structural-monitoring system.

To surmount this limitation of active approaches, it is has been proposed to make recourse to passive methods exploiting ambient noise naturally present in the structure, i.e. noise induced by exterior mechanical stresses (aerodynamic turbulence, engine vibrations, etc.). The needs of the system in terms of power are thus greatly decreased. The electronic system is also simplified because it no longer requires an emission function, but only a reception function.

For example, document WO 2015/082292 describes an ultrasound-tomography method exploiting noise scattered in the interior of a structure. The drawback of this approach is that it requires a substantial number of sensors—this increasing its cost—and complex processing of the acquired data.

The article by Eric Larose, Philippe Roux, Michel Campillo "Reconstruction of Rayleigh-Lamb dispersion spectrum based on noise obtained from an air-jet forcing", J. Acoust. Soc. Am. 12 (6), December 2007, describes a method for reconstructing a dispersion curve of elastic waves in a plate- or shell-type structure from ambient noise. The application to structural health monitoring is simply mentioned without details being provided. Furthermore, the reconstruction method used in this article requires a high number of noise measurements to be acquired so as to realize dense meshing of the structure (one hundred acquisitions and as many measurements points spaced apart by 1 cm, the acquisitions being obtained by moving 16 sensors, for a square plate of 1 m side length), this making this method impractical.

The article by K. G. Sabra et al. "Using cross correlations of turbulent flow-induced ambient vibrations to estimate the structural impulse response. Application to structural health monitoring", J. Acoust. Soc. Am. 121 (4), April 2007 describes a method for monitoring structural health comprising acquiring an ambient noise with two non-collocated sensors, determining an impulse response of the structure by correlation of the signals output by the two sensors and using this impulse response to carry out a modal analysis of the structure. Although it allows structural defects to be detected, the method disclosed by this publication does not allow material parameters to be determined, and therefore the effects of ageing to be tracked.

SUMMARY OF THE INVENTION

The invention aims to overcome the aforementioned drawbacks of the prior art. More particularly, it aims to provide a method and system for monitoring structural health allowing the ageing of a structure to be tracked reliably, simply and economically.

One subject of the invention allowing this aim to be achieved is a method for monitoring the structural health of a structure that supports guided propagation modes of elastic waves, comprising the following steps:

a) acquiring an ambient noise propagating through the structure by means of at least one pair of non-collocated elastic-wave sensors;

b) estimating, from the ambient noise acquired in step a), a function representative of an impulse response of the structure for elastic propagation between the constituent sensors of said pair;

c) extracting at least one dispersion curve of the elastic propagation through the structure by time-frequency analysis of the function representative of an impulse response obtained in step b); and d) estimating at least one parameter indicative of a mechanical property of a constituent material of the structure from the dispersion curve obtained in step c).

According to particular embodiments of such a method:

The elastic noise may be acquired over a duration at least equal to the mixing time of the structure.

Said step b) may be implemented using a method chosen from: calculation of the correlation of the elastic noise acquired by the sensors of the pair; the passive-inverse-filter method; and correlation of the coda of correlations.

Said step c) may comprise calculating the time-of-flight, between the sensors of the pair, of a plurality of elastic wave packets having different central frequencies.

Said step d) may be implemented using a method chosen from regression with respect to an analytical model of the dispersion curve and inversion of a numerical model.

Step d) may comprise estimating at least one modulus of elasticity of a constituent material of the structure, or a function of at least one such modulus.

Step d) may be implemented using an iterative method initialized with a value of said parameter at the start of the life of the structure.

Steps a) to d) are implemented a plurality of times in the course of a period of use of the structure, the method also comprising the following steps:

e) tracking the temporal variation in the parameter estimated in step d); and f) triggering an alarm when the tracking carried out in step e) indicates an ageing of the structure approaching a critical level.

Steps a) to d) may be implemented a plurality of times using respective pairs of non-collocated sensors, each pair of sensors having a different orientation.

The method may also comprise a measurement of the temperature of the structure and the use of the result of this measurement in the implementation of step d).

The method may be implemented passively.

The ambient noise acquired in step a) may be recorded and transferred to a data-processing device that is remote from the structure, the following steps of the method being implemented in non-real time by said data-processing device.

Said structure may be of beam, tube, plate or shell type.

Another subject of the invention is a system for monitoring the structural health of a structure of plate or shell type, comprising:

at least one pair of non-collocated elastic-wave sensors allowing an ambient noise propagating through the structure to be acquired; and a data-processing device configured to:

receive, from said sensors, a signal representative of the acquired ambient noise;

estimate, from the ambient noise acquired in step a), a function representative of an impulse response of the structure for the elastic propagation between the constituent sensors of said pair;

extract at least one dispersion curve of the elastic propagation through the structure by time-frequency analysis of said function representative of an impulse response; and estimate at least one parameter indicative of a mechanical property of a constituent material of the structure from said dispersion curve.

According to particular embodiments of such a system:

Said elastic-wave sensors may be chosen from fiber-optic Bragg-grating sensors, microelectromechanical accelerometers and piezoelectric sensors.

The system may also comprise a temperature sensor and said data-processing device may also be configured to use a measurement of the temperature of the structure acquired by said sensor to estimate said parameter indicative of a mechanical property of a constituent material of the structure.

BRIEF DESCRIPTION OF THE DRAWINGS

Other features, details and advantages of the invention will become apparent on reading the description given with reference to the appended drawings, which are given by way of example and show, respectively.

DETAILED DESCRIPTION

Figure 1:
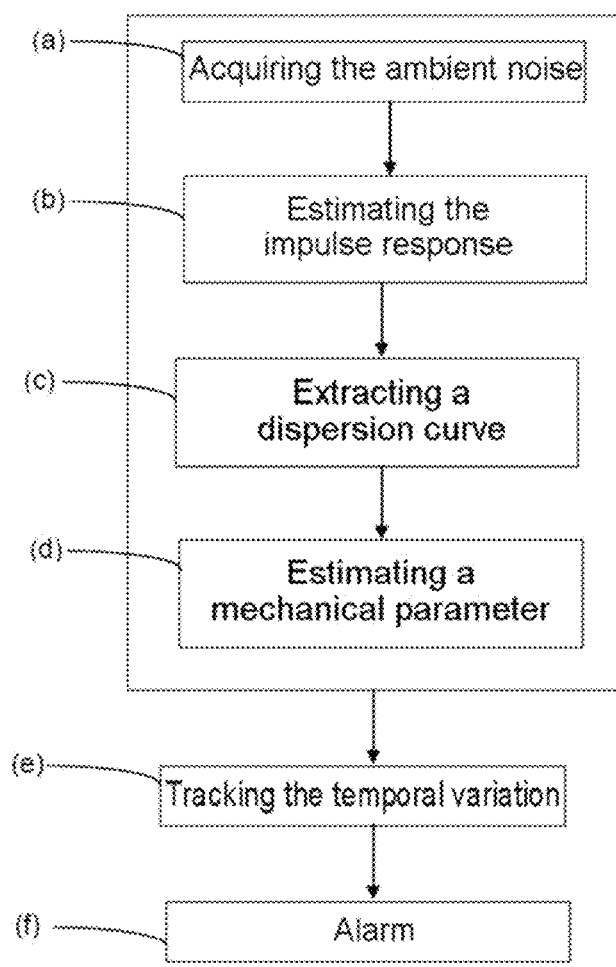
FIG. 1, a flowchart of a method according to one embodiment of the invention.

As illustrated in FIG. 1, a method according to one embodiment of the invention comprises:

A first step (a) of acquiring ambient noise propagating through the structure under test by means of at least two sensors located in different locations.

A second step (b) of estimating the impulse response (Green's function)—or more generally a function representative of this impulse response but not necessarily identical thereto—from the acquisitions carried out in the first step.

A third step (c) of extracting a dispersion curve by time-frequency analysis of the impulse response estimated in the second step.

A fourth step (d) of estimating, from this dispersion curve, a mechanical parameter characterizing the material from which the structure is made. It may for example be a question of the Young's modulus, and more generally of a modulus of the tensor of the elastic constants (modulus of elasticity), or a function of one or more of these moduli.

Steps (a) to (d) are repeated a number of times, preferably at regular intervals, over the lifetime of the structure, this allowing the temporal variation in the mechanical parameter estimated in step (d), and therefore the ageing of the material in question, to be tracked (step (e)). When this ageing approaches a critical level, an alarm may be triggered (step (f)). For example, the event that triggers the alarm may be the decrease in the Young's modulus below a certain level.

Below, various embodiments of steps (a) to (d) will be described in detail.

First Step: Acquiring Ambient Noise

By ambient noise what is meant is a field of elastic waves in the structure originating from a multitude of randomly positioned sources, potentially of very low intensities, at random times and or from more intense sources in a more limited number generating waves that are scattered multiple times in reverberating cavities or by scattering media.

Figure 9:
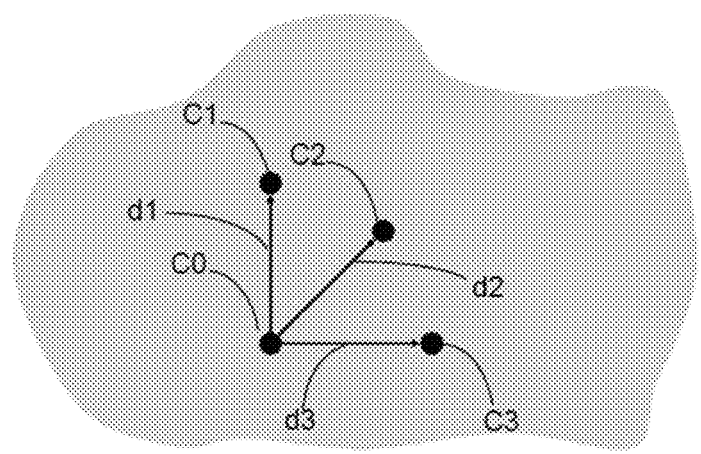
FIG. 9, an arrangement of a plurality of sensors according to one embodiment of the invention.

This ambient noise may be acquired by means of various sorts of sensors known in the art: piezoelectric transducers (PZTs), microelectromechanical accelerometers (MEMS), fiber-optic Bragg gratings (FBGs), etc. Implementation of the invention requires at least two such sensors, integrated into the structure in two different locations. For the sake of simplicity, it will be sought to minimize the number of sensors, and therefore to use only one pair thereof whenever it is possible to do so. In certain cases however it will be necessary to use several sensors, in particular if it is desired to track the ageing in a plurality of zones of the structure or if an anisotropic composite that it is desired to characterize in a plurality of directions is being worked on. The latter situation is illustrated in FIG. 9, where four sensors C0, C1, C2, C3 form three pairs (C0, C1), (C0, C2), (C0, C3) that allow the structure to be characterized in three directions d1, d2, d3. Of course, it is possible to use even more sensors to characterize the structure in a higher number of directions. It is also possible to use the four sensors to characterize the structure in three additional directions, by considering the pairs (C1, C2), (C1, C3) and/or (C2, C3).

The acquisition is completely passive; it requires little energy and therefore a system according to the invention may easily be located on-board an airplane, a ship or at the bottom of the sea. This passive measurement is compatible with the use of transducers operating solely in reception mode, such as the aforementioned FBGs. This FBG option is particularly advantageous when it is desired to equip the structure with a number of measurement points higher than two, for example in order to track the ageing of a plurality of zones of the structure. Specifically, whereas use of PZTs requires two electrical wires per sensor, a single optical fiber—for example integrated between the plies of a composite material—may comprise tens of measurement points. The number of points of entry into the structure is therefore greatly limited, this further limiting points of potential weakness.

The effectiveness of the method is increased because the elastic field is diffuse. Geometric elements that diffract the elastic waves multiple times are therefore not disadvantageous; on the contrary, they improve the relevance of the method. This is particularly true in industrial structures that are never simple plates but that comprise stiffeners, rivets, or regions of localized larger thickness, etc. The convergence of the method is facilitated when the condition of equi-distribution of energy is met, i.e. when the distribution in phase and in amplitude of the waves is random, and when therefore the latter propagate uniformly in every direction. This condition is in particular met (non-necessary but sufficient condition) when the acquisition of the signals is carried out over a duration at least equal to the mixing time of the structure. The mixing time is defined as the time required for an elastic wave to give rise to a diffuse field, without privileged propagation direction.

Figure 2:
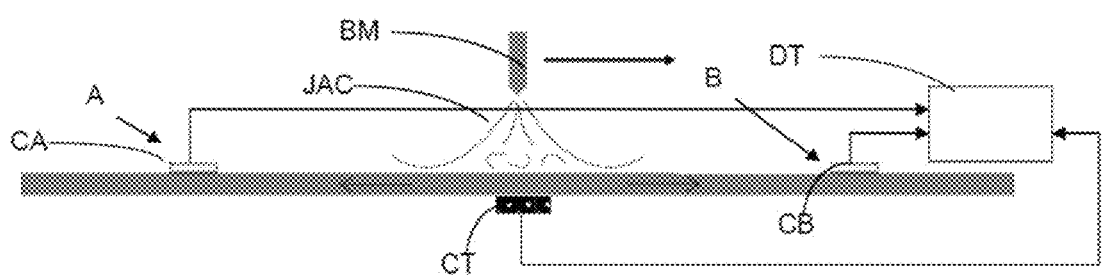
FIG. 2, an apparatus according to one embodiment of the invention.
Figure 3:
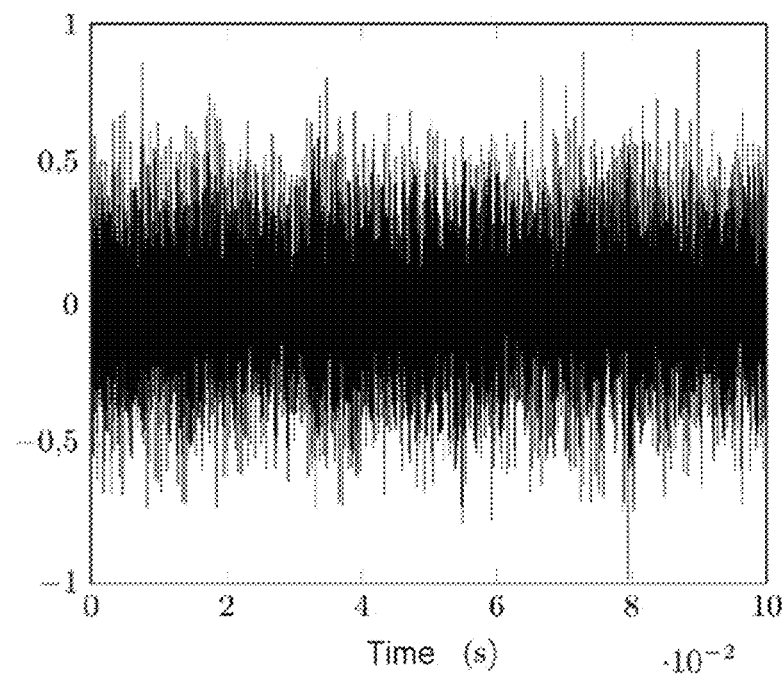
FIG. 3, a plot of the ambient noise acquired over 0.1 seconds.

FIG. 2 illustrates a system for monitoring structural health according to one embodiment of the invention, which has been used for demonstration purposes. The structure S consists of an aluminum plate of 2 mm thickness, to which have been fastened two piezoelectric transducers CA, CB that were used as sensors, and which transducers were located at the points A and B, arranged on the surface of the structure and spaced apart by 600 mm. The ambient noise was created using a movable nozzle BM that was moved pseudo-randomly in order to direct a jet of compressed air JAC onto the plate. The ambient noise was acquired by the transducers during a time of 10 seconds; FIG. 3 shows the signal acquired by the transducers CA during 0.1 seconds.

Natural sources of noise in industrial structures may, for example, be the turbulent boundary layer in aeronautics, the impact of waves, vibrations induced by engines or a turbulent flow in a tube (penstocks).

The ultrasonic field sensed by the transducers is transmitted to a data-processing device DTD. The latter in general comprises electronics for conditioning (amplifying, filtering) and converting to digital format the signals output by the sensors, and a digital processor that implements the following steps—(b) to (d), or (b) to (f), of the method. The digital processor may be a computer or a board comprising a microprocessor equipped with a memory storing a suitable program, or indeed a dedicated digital circuit, produced from a programmable device such as an FPGA. The data-processing device may be composed of two distinct portions, one associated with the structure and the other remote. In the case, for example, where the structure to be monitored is an element of an airplane, the on-board portion may store the signals, the processing being carried out by a computer on the ground after landing. Or indeed the on-board portion may transmit the signals to the ground via a radio link, this allowing processing in real time if necessary. Yet another option consists in carrying out the processing in the on-board portion of the system and of transmitting (or storing locally) only the results, i.e. the identified material parameters.

A temperature sensor (reference CT in FIG. 2) may optionally be provided in order to precisely calibrate the distance between the sensors, if it is not well known, or indeed to compensate for the effects of temperature on the propagation of the waves.

Specifically, a method according to the invention needs to know with a high precision the position of the sensors. An alternative to the measurement of the individual positions of the sensors is a calibration carried out just after their placement, at a controlled temperature, in order to measure the times-of-flight between the sensors. Knowing the speed of the initial state at to it is possible to deduce therefrom the position of the sensors with a very good precision. If the speed of the initial state is not known precisely, it is possible to store the time-of-flight for each pair of sensors and to work on a variation in time-of-flight.

Knowing the temperature at the moment of the calibration, if the temperature of the structure is measured using an integrated thermocouple at the time t it is possible, furthermore, to compensate for the variation in time-of-flight induced by temperature (think of the large variations in temperature during the flight of an airplane).

Second Step: Estimating the Impulse Response (Green's Function)

A plurality of known prior-art methods allow the Green's function of the structure—defining its impulse response—to be determined from measurements of ambient noise. One preferred embodiment of the invention uses the correlation of diffuse elastic fields, as described in the article by R. L. Weaver and O. I. Lobkis "Ultrasonics without a source: Thermal fluctuation correlations at MHz frequencies" Physical Review Letters, 87:134301, 2001.

This method makes provision to calculate a cross-correlation of the elastic fields $u_A$ and $u_B$ (movement fields) acquired simultaneously by the sensors CA and CB:

$$\Gamma_{AB}(t) = \int u_A(t+\tau) \cdot u_B(\tau) d\tau.$$

Figure 4:
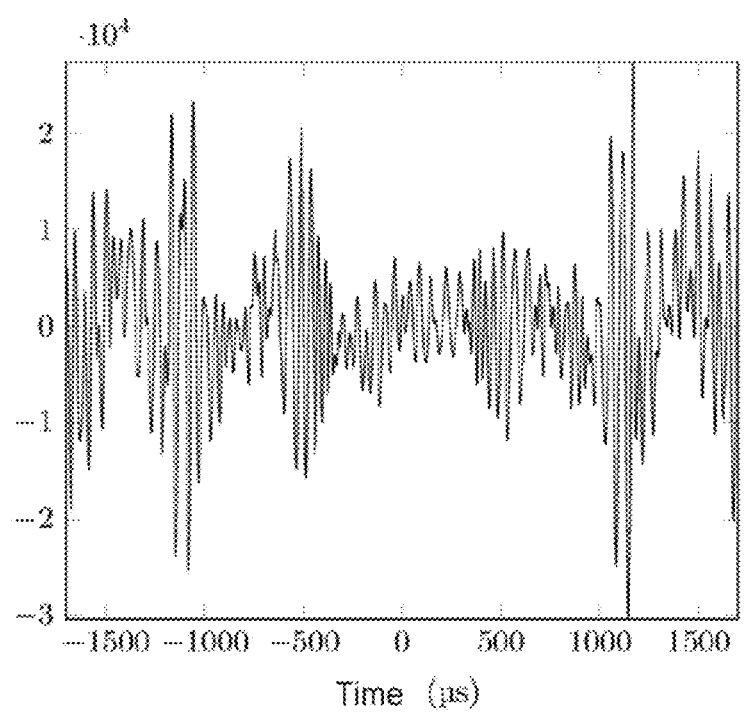
FIG. 4, the cross-correlation of the ambient noise acquired by two sensors, over 10 seconds.

FIG. 3 is a section of a plot of noise acquired in the system of FIG. 2, and FIG. 4 is a graph of a cross-correlation obtained from such noise, measured at two different locations.

When the distribution in phase and amplitude of the elastic waves is random (condition of equi-distribution of energy), this generally being the case if the structure is scattering and if the noise is acquired over a sufficient duration (longer than or equal to the mixing time) there is a relationship between this cross-correlation and the causal and anti-causal Green's functions ($G_{AB}(t)$) and ($G_{BA}(-t)$) between the points A and B:

$$\frac{\partial \Gamma_{AB}(t)}{\partial t} \approx F(t) \otimes [G_{AB}(t) - G_{BA}(-t)]$$

where F is a filter that takes into account the passband of the sensors and the spectrum of the ambient noise present in the structure.

It will be recalled that the Green's function between A and B is the recording that would be obtained at B if a source emitted an impulse signal at A (the impulse response of the medium is therefore spoken of).

It is also possible to not calculate the derivative, and for example to directly use the cross-correlation as the function representative of the impulse response. Specifically, the aim of this step is not to determine the Green's function as such, but to characterize the impulse response in order to then be able (step (b)) to extract dispersion curves therefrom.

In order to be able to determine the causal and anti-causal Green's functions between A and B exactly, it is necessary for the transducers to have a constant frequency response and for the ambient noise to be a white noise. In practice, these conditions will never be met exactly, but may be met approximately and sufficiently to achieve the aims of the invention. Experience shows that satisfactory results may be obtained for transducers having a passband comprised between 1 kHz (or a few kHz) and a few MHz, 10 MHz for example.

Other methods may be used if the condition of equi-distribution of energy is not met. Mention will in particular be made of two thereof:

the passive inverse filter, described in the article by T. Gallot et al. "A passive inverse filter for Green's function retrieval", J. Acoust. Soc. Am. 131 (1), January 2012;

Correlation of the coda of correlation, described in the article by L. Sthely at al. "Reconstructing Green's function by correlation of the coda of the correlation ($C^3$) of ambient seismic noise", Journal Of Geophysical Research, Vol. 113, B11306, (2008). The latter technique requires at least three sensors.

Third Step: Extraction of a Dispersion Curve

The guided elastic waves that are able to propagate through guiding mechanical structures (beams; plates or shells, which support so-called Lamb modes; large objects the surfaces of which support Rayleigh waves) are in general dispersive: propagation speed depends on frequency. Each guided propagation mode may be characterized by curves—called dispersion curves—representing various characteristics of the mode (wave number, phase velocity, group velocity, wavelength, or even attenuation) as a function of frequency. Below, group velocity will essentially be considered, but this must not be considered to be limiting. These dispersion curves may be estimated from a knowledge of the impulse response, obtained in the preceding step, by virtue of time-frequency analysis techniques.

Time-frequency analysis techniques advantageously require a limited number of sensors, contrary to techniques using a spatio-temporal Fourier transform. In the article by Eric Larose, Philippe Roux, Michel Campillo "Reconstruction of Rayleigh-Lamb dispersion spectrum based on noise obtained from an air-jet forcing", J. Acoust. Soc. Am. 12 (6), December 2007, a spatio-temporal Fourier transform is applied, this requiring the use of sixteen sensors that have to be moved in order to obtain in the end about one hundred recordings. The use of a spatio-temporal Fourier transform with a limited number of sensors greatly degrades the measurement.

The advantage of dispersion curves for structural health monitoring is that they depend directly on parameters of the material of the plate. In the case of an isotropic uniform material, these parameters may be expressed by the Young's modulus and/or the Poisson's ratio, which are conventionally used in mechanics to study the behavior of materials. More generally, it may be a question of one or more moduli of the tensor of the elastic constants of the material, or of functions of these moduli.

Figure 5A:
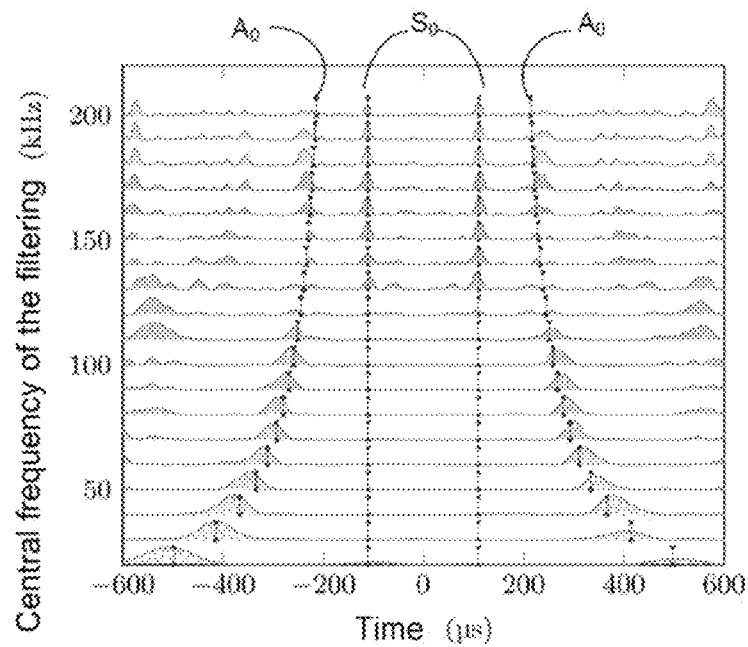
FIGS. 5*a* and 5*b*, a time-frequency analysis of a function representative of the impulse response of the structure obtained by cross-correlation and by applying the passive-inverse-filter method, respectively.
Figure 5B:
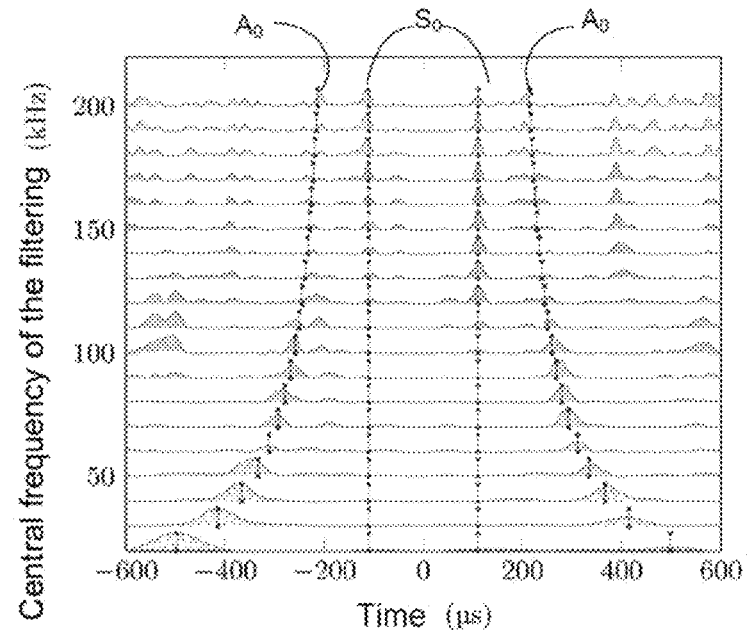

The simplest technique for obtaining a dispersion curve consists in filtering the impulse response of the structure with bandpass filters having different central frequencies. In this way a plurality of wave packets are obtained, at different times related to their group velocities. This is illustrated in FIGS. 5A and 5B, FIG. 5A was obtained by calculating the cross-correlation of the noise, and FIG. 5B using the inverse-filter technique; the acquired noise was the same in both cases and was obtained using the system of FIG. 2.

These figures show the presence of two modes, a low-dispersion mode $S_0$ at high frequency, and a higher dispersion mode $A_0$ at low frequency. Markers, of square shape for the mode $A_0$ and of circular shape for the mode $S_0$, identify the theoretical times-of-flight for the wave packets; it may be seen that they coincide, to a very good approximation, with the peaks of the wave packets calculated according to the invention. Below, only the mode $A_0$ will be considered.

By identifying the time corresponding to the maximum of each wave packet, the time-of-flight of the packet over the distance A-B and, therefore, the group velocity at the central frequency of the packet, are determined.

The appearance of the mode $S_0$ toward 120 kHz creates a reflection at the edges of the plate of this mode which interferes with $A_0$ ($S_0$ propagates about two times faster than $A_0$ at these frequencies). It is therefore not possible to take advantage of the times of flight above 120 kHz in this configuration. In practice, this problem may be avoided by placing the sensors far from the reflecting edges.

Other time-frequency analysis techniques may be used, for example reassigned spectrograms, reassigned scalograms, the Hilbert-Huang transform, the synchrosqueezing transform, etc.

For example, the synchrosqueezing transform and the reassigned-spectrogram method are described in the article by F. Auger, P. Flandrin, Y.-T. Lin, S. Mclaughlin, S. Meignen, T. Oberlin, H.-T. Wu, "Time-Frequency Reassignment and Synchrosqueezing: An overview", IEEE Signal Processing Magazine, vol. 30, no. 6, pp. 32-41, November 2013.

Figure 6A:
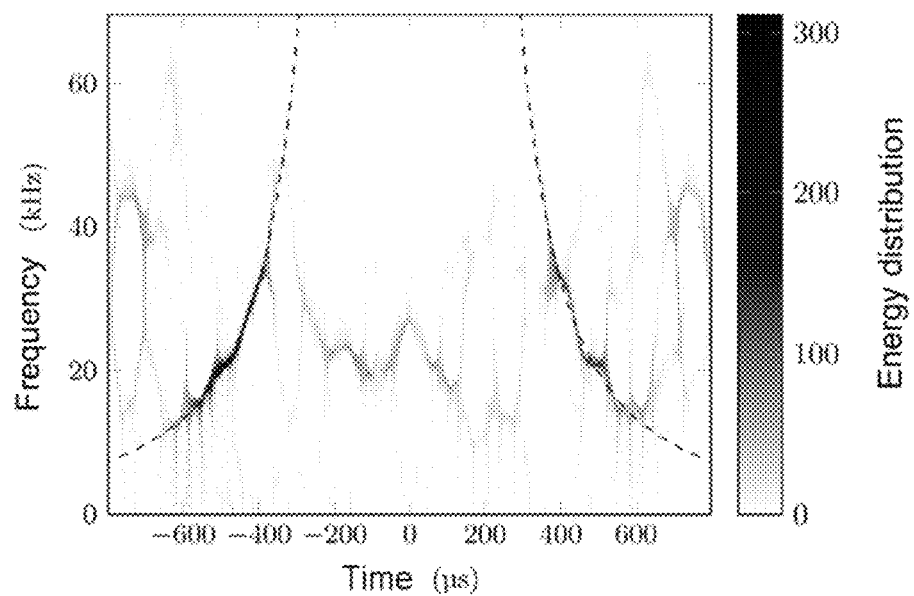
FIGS. 6*a* and 6*b*, another time-frequency analysis of a function representative of the impulse response of the structure obtained by cross-correlation by applying the passive-inverse-filter method, respectively.
Figure 6B:
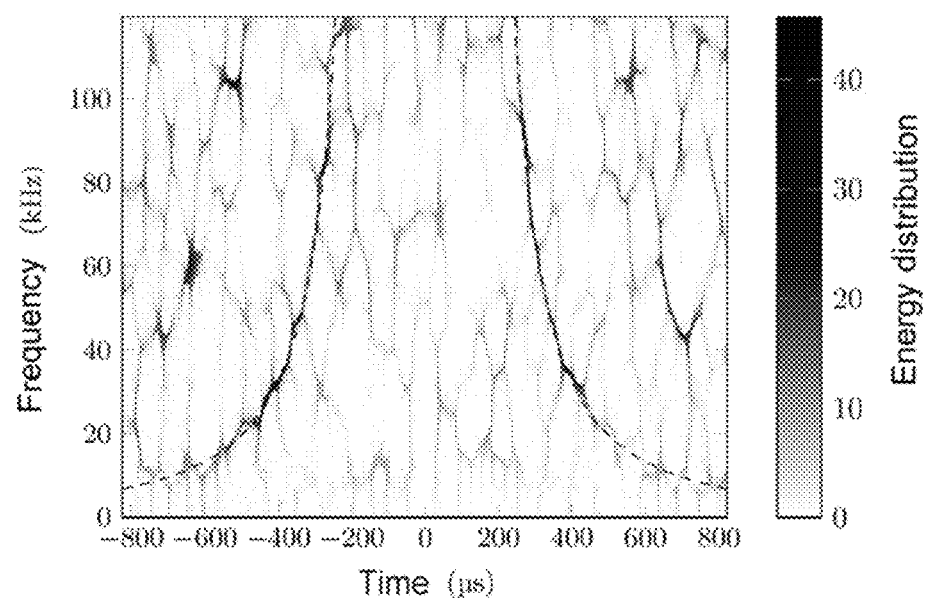

FIGS. 6A and 6B illustrate reassigned spectrograms containing the same information as the graphs of FIGS. 5A and 5B.

Figure 7A:
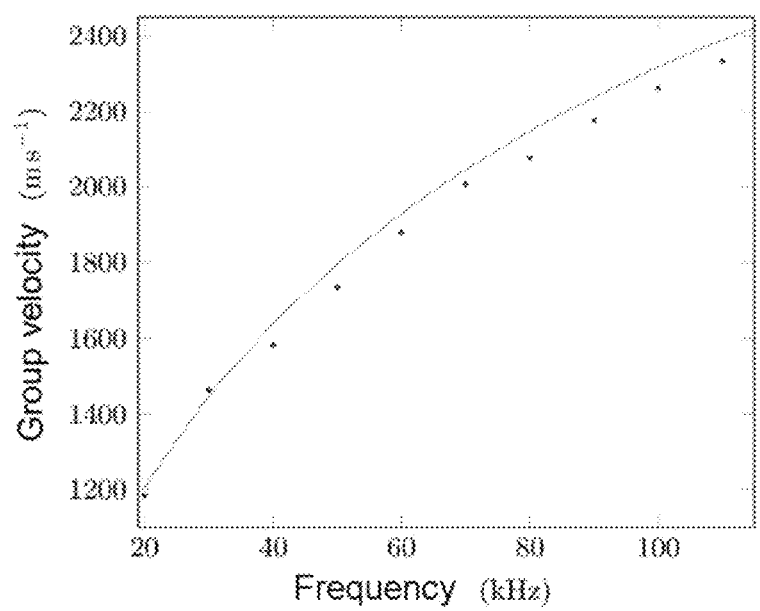
FIGS. 7*a* and 7*b*, dispersion curves obtained by cross-correlation and by applying the passive-inverse-filter method, respectively.
Figure 7B:
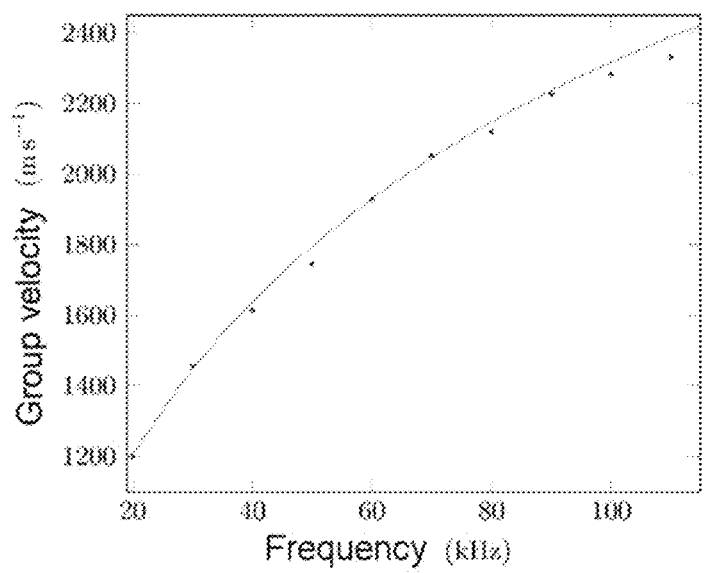

FIGS. 7A and 7B show the variation in the group velocities obtained by identifying times-of-flight with passive signals acquired by the system of FIG. 2 for the case of the derivative of the correlation of diffuse elastic fields (7A) and for the case of the passive inverse filter (7B). In these figures, the points represent the calculated values and the lines the theoretical dispersion curves. It may be seen that the experimental results are in good agreement with the theory, this proving the feasibility of the identification of mechanical characteristics by passive methods.

Fourth Step: Estimation of a Mechanical Parameter Characterizing the Material from which the Structure is Made This fourth step may be implemented by minimizing the discrepancy between the experimentally reconstructed dispersion curves and the curves obtained using a theoretical, analytical or numerical model. This minimization allows the properties of the material of the structure to be accessed. Therefore, a minimization is carried out either with respect to an analytical equation, when one is known, or by inversion of a numerical model of the calculation of the indicators.

When it is sought to track the ageing of a material, its mechanical properties are known at a time to taken as being the start of its life. This knowledge allows the minimizing method, which is implemented iteratively, to be initialized. This initialization will necessarily be very close to the result, preventing any risk of convergence to a local minimum. During the lifetime of the material, the estimated parameter will vary as the material ages.

Figure 8:
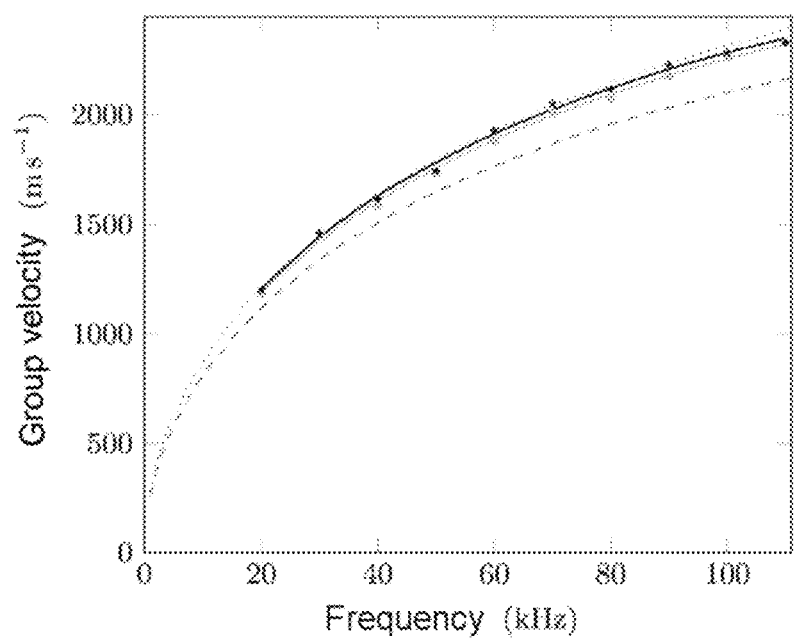
FIG. 8, a comparison between the dispersion curves obtained using methods according to various embodiments of the invention and theoretical curves.

By way of example, let experimental data acquired in the band [20; 110] kHz on an aluminum plate of 2 mm thickness (see FIG. 2) be considered. The dotted curve in FIG. 8 shows the dispersion curve of the theoretical group velocity of the mode $A_0$, for a structure at the start of its life; the dashed curve was obtained by decreasing by 25% the Young's modulus of the material, so as to simulate the effects of ageing. These curves were calculated using the semi-analytical finite element (SAFE) method described in the article by I. Bartoli et al. "Modeling wave propagation in damped waveguides of arbitrary cross-section", Journal of Sound and Vibration 295, pp. 685-707 (2006).

Again in FIG. 8, the grey dots correspond to the values of the group velocity calculated, from the experimental data, by cross-correlation; and the black stars correspond to the values calculated by the passive-inverse-filter method. The continuous grey and black lines are respectively curves calculated by regression using Mindlin-Reissner theory. This theory provides an analytical expression for group velocity as a function of two parameters: plate velocity $V_P$ and shear velocity modified by Mindlin theory $V_T'$. The plate velocity $V_P$ is the group velocity of the mode $S_0$ at zero frequency, and is given by $$V_P = 2V_T\sqrt{1 - \frac{V_T^2}{V_L^2}},$$

where $V_L$ is the phase velocity of longitudinal waves and $V_T$ the phase velocity of transverse or shear waves. The values of these parameters are chosen so as to minimize the variance with respect to the values of group velocity obtained from the experimental results (grey points and black stars).

Once the values $V_P$ and $V_T$ have been determined, it is possible to calculate the Young's modulus E and Poisson's ratio ν using the following relationships:

$$E = \frac{12\rho\frac{V_T'^2}{\pi^2}\left[\dfrac{3}{1 - \dfrac{\pi^2 V_P^2}{48 V_T'^2}} - 4\right]}{\dfrac{1}{1 - \dfrac{\pi^2 V_P^2}{48 V_T'^2}} - 1}$$

$$\nu = \frac{\dfrac{1}{1 - \dfrac{\pi^2 V_P^2}{48 V_T'^2}} - 2}{2\left[\dfrac{1}{1 - \dfrac{\pi^2 V_P^2}{48 V_T'^2}} - 1\right]}$$

Table 1 shows the theoretical values of $V_P$, $V'_T$, E and ν, and the values determined using the correlation-derivative method and the passive-inverse-filter method. The percentage errors with respect to the theoretical values (plate of 2024 aluminum of 2 mm thickness) are entirely acceptable.

TABLE 1

|  | Theory (m/s) | Correlation (m/s) | Passive inverse filter (m/s) |
|---|---|---|---|
| Plate velocity | 5461 | 5286 (3.2% error) | 5470 (0.2% error) |
| Shear velocity (Mindlin) | 2848 | 2816 (1.1% error) | 2812 (1.3% error) |
| Young's modulus (GPa) | 71.3 | 68.2 (4.3% error) | 70.5 (3.2% error) |
| Poisson's ratio | 0.34 | 0.31 (8.8% error) | 0.36 (5.9% error) |

Table 2 shows the effect of an ageing that corresponds to a decrease of the Young's modulus of 25%, this conventionally being used in the literature. A damaged state in which E=53.5 GPa is therefore passed to from a healthy state in which E=71.3 GPa. The system is therefore sufficiently sensitive to detect such variations and therefore anticipate the ageing of the material before it becomes critical.

TABLE 2

|  | Young's modulus 100% | Young's modulus 75% |
|---|---|---|
| Plate speed | 5461 | 4733 (13.3% variation) |
| Shear speed (Mindlin) | 2848 | 2466 (13.4% variation) |

This step may use techniques for identifying various parameters of a simple regression, for example artificial neural networks. See for example E. Pabisek and Z. Waszczyszyn, "Identification of thin elastic isotropic plate parameters applying Guided Wave Measurement and Artificial Neural Networks" Mechanical Systems and Signal Processing, 2015.

The technique described up to now takes advantage of natural sources of noise present in the structure. Nothing prevents, in certain cases, active sources of noise, for example PZTs placed in the structure, being added in order to be able to take measurements even in the absence of noise (for example, in an airplane if the natural sources are turbulence in flight, it is also possible to use active sources in order to be able to take a measurement on the ground, when there is no longer any noise in the structure). These sources have no need to be synchronized with the receivers, this simplifying the electronics with respect to active methods.

The invention claimed is:

1. A method for monitoring the structural health of a structure that supports guided propagation modes of elastic waves, comprising the following steps:
   a) acquiring an ambient noise propagating through the structure by means of at least one pair of non-collocated elastic-wave sensors;
   b) estimating, from the ambient noise acquired in step a), a function representative of an impulse response of the structure for elastic propagation between the constituent sensors of said pair;
   c) extracting at least one dispersion curve of the elastic propagation through the structure by time-frequency analysis of the function representative of an impulse response obtained in step b), said time-frequency analysis comprising calculating the time-of-flight, between the sensors of the pair, of a plurality of elastic wave packets having different central frequencies; and
   d) estimating at least one parameter indicative of a mechanical property of a constituent material of the structure from the dispersion curve obtained in step c).

2. The method as claimed in claim 1, wherein the elastic noise is acquired over a duration at least equal to a mixing time of the structure.

3. The method as claimed in claim 1, wherein said step b) is implemented using a method chosen from:
   calculation of the correlation of the elastic noise acquired by the sensors of the pair;
   the passive-inverse-filter method; and
   correlation of the coda of correlations.

4. The method as claimed in claim 1, wherein said step d) is implemented using a method chosen from regression with respect to an analytical model of the dispersion curve and inversion of a numerical model.

5. The method as claimed in claim 1, wherein step d) comprises estimating at least one modulus of elasticity of a constituent material of the structure, or a function of at least one such modulus.

6. The method as claimed in claim 1, wherein step d) is implemented using an iterative method initialized with a value of said parameter at the start of the life of the structure.

7. The method as claimed in claim 1, wherein steps a) to d) are implemented a plurality of times in the course of a period of use of the structure, the method also comprising the following steps:
   e) tracking the temporal variation in the parameter estimated in step d); and
   f) triggering an alarm when the tracking carried out in step e) indicates an ageing of the structure approaching a critical level.

8. The method as claimed in claim 1, wherein steps a) to d) are implemented a plurality of times using respective pairs of non-collocated sensors each pair of sensors having a different orientation.

9. The method as claimed in claim 1, also comprising a measurement of the temperature of the structure and the use of the result of this measurement in the implementation of step d).

10. The method as claimed in claim 1, said method being implemented passively.

11. The method as claimed in claim 1, wherein the ambient noise acquired in step a) is recorded and transferred to a data-processing device that is remote from the structure, the following steps of the method being implemented in non-real time by said data-processing device.

12. The method as claimed in claim 1, wherein said structure is of beam, tube, plate or shell type.

13. A system for monitoring the structural health of a structure of plate or shell type, comprising:
   at least one pair of non-collocated elastic-wave sensors allowing an ambient noise propagating through the structure to be acquired; and
   a data-processing device configured to:
   receive, from said sensors, a signal representative of the acquired ambient noise;
   estimate, from the ambient noise acquired in step a), a function representative of an impulse response of the structure for the elastic propagation between the constituent sensors of said pair;
   extract at least one dispersion curve of the elastic propagation through the structure by time-frequency analysis of said function representative of an impulse response, said time-frequency analysis comprising calculating the time-of-flight, between the sensors of the pair, of a plurality of elastic wave packets having different central frequencies; and
   estimate at least one parameter indicative of a mechanical property of a constituent material of the structure from said dispersion curve.

14. The system as claimed in claim 13, wherein said elastic-wave sensors are chosen from fiber-optic Bragg-grating sensors, microelectromechanical accelerometers and piezoelectric sensors.

15. The system as claimed in claim 13, also comprising a temperature sensor and wherein said data-processing device is also configured to use a measurement of the temperature of the structure acquired by said sensor to estimate said parameter indicative of a mechanical property of a constituent material of the structure.

* * * * *